United States Patent
Jao et al.

(10) Patent No.: US 9,647,531 B2
(45) Date of Patent: May 9, 2017

(54) SOFT-START SWITCHING POWER CONVERTER

(71) Applicant: Richtek Technology Corp., Zhubei (TW)

(72) Inventors: Tong-Cheng Jao, Taichung (TW); Yi-Wei Lee, Taipei (TW); Isaac Y. Chen, Zhubei (TW)

(73) Assignee: Richtek Technology Corp., Zhubei (TW)

( * ) Notice: Subject to any disclaimer, the term of this patent is extended or adjusted under 35 U.S.C. 154(b) by 184 days.

(21) Appl. No.: 14/526,187

(22) Filed: Oct. 28, 2014

(65) Prior Publication Data

US 2015/0117072 A1    Apr. 30, 2015

(30) Foreign Application Priority Data

Oct. 29, 2013 (TW) .............................. 102139084 A

(51) Int. Cl.
*H02M 1/36* (2007.01)
*H02M 3/335* (2006.01)

(52) U.S. Cl.
CPC .......... *H02M 1/36* (2013.01); *H02M 3/33507* (2013.01); *H02M 3/33523* (2013.01); *H02M 3/33553* (2013.01)

(58) Field of Classification Search
CPC ............... H02M 1/36; H02M 3/33507; H02M 3/33523; H02M 3/33553
USPC .................................................... 363/21.12
See application file for complete search history.

(56) References Cited

U.S. PATENT DOCUMENTS

| 8,125,798 B2 * | 2/2012 | Huynh | H02M 3/335 363/147 |
| 8,630,103 B2 * | 1/2014 | Baurle | H02M 3/33507 363/21.17 |
| 2003/0202364 A1 * | 10/2003 | Lomax, Jr. | H02M 3/33507 363/21.09 |

(Continued)

FOREIGN PATENT DOCUMENTS

| CN | 1106594 A | 8/1995 |
| CN | 201087939 Y | 7/2008 |

(Continued)

OTHER PUBLICATIONS

M. Mingping et al., "An Innovative and High Performance 8 Pin LLC Resonant Controller." Electronic Engineering & Product World, vol. 8, pp. 43-45, 2009.

*Primary Examiner* — Fred E Finch, III
*Assistant Examiner* — Rafael O De Leon Domenech
(74) *Attorney, Agent, or Firm* — Blank Rome LLP

(57) ABSTRACT

A soft-start switching power converter includes a voltage converting circuit and a soft-start circuit. The voltage converting circuit includes a transformer, and a first switch which includes a first terminal connected to the transformer, a second terminal providing a trigger signal, and a control terminal receiving a control signal, and which is controlled to switch between conduction and nonconduction, such that the transformer generates a feedback voltage. The soft-start circuit receives the trigger signal, generates the control signal according to the trigger signal, and determines whether or not to clamp the control signal at a preset voltage level based on the trigger signal.

15 Claims, 8 Drawing Sheets

(56) References Cited

U.S. PATENT DOCUMENTS

| | | | |
|---|---|---|---|
| 2011/0069420 A1* | 3/2011 | Chiu | H02M 1/36 361/91.1 |
| 2011/0075450 A1 | 3/2011 | Shimada | |
| 2011/0204866 A1* | 8/2011 | Moon | H02M 3/33523 323/284 |
| 2012/0033465 A1* | 2/2012 | Lee | H02M 3/33507 363/53 |
| 2015/0023070 A1* | 1/2015 | Nate | H02M 3/33507 363/21.17 |
| 2015/0029763 A1* | 1/2015 | Shen | H02M 1/44 363/21.18 |

FOREIGN PATENT DOCUMENTS

| | | |
|---|---|---|
| TW | M366243 U1 | 10/2009 |
| TW | 201104658 A1 | 2/2011 |

\* cited by examiner

SOFT-START SWITCHING POWER CONVERTER

CROSS-REFERENCE TO RELATED APPLICATION

This application claims priority of Taiwanese Patent Application No. 102139084, filed on Oct. 29, 2013.

BACKGROUND OF THE INVENTION

1. Field of the Invention

The invention relates to a power converter, more particularly to a soft-start switching power converter.

2. Description of the Related Art

Referring to FIG. 1, a conventional switching power converter 1 which receives an alternating-current (AC) voltage from an AC power source 10, and which outputs a direct-current (DC) output voltage based on the AC voltage is illustrated. The conventional switching power converter 1 includes a rectifier circuit 11, a voltage converter circuit 12 and a control signal generator module 13.

The rectifier circuit 11 is connected electrically to the AC power source 10 for receiving the AC voltage from the AC power source 10, and rectifies the AC voltage so as to generate a rectified voltage VRE.

The voltage converter circuit 12 is connected electrically to the rectifier circuit 11 for receiving the rectified voltage VRE, receives a control signal, adjusts the rectified voltage VRE based on the control signal so as to output the DC output voltage, and generates an output signal, a divided voltage signal and a driving voltage. The voltage converter circuit 12 includes a voltage converter 120, a series connection of two resistors 121 and 122, a capacitor 123, a switch 124, an output unit 125 and a voltage divider unit 126.

The voltage converter 120 is connected electrically to the rectifier circuit 11 for receiving the rectified voltage VRE. The resistors 121 and 122 are connected between the rectifier circuit 11 and the capacitor 123, and the capacitor 123 is grounded. A portion of a current flowing through the resistors 121 and 122 charges the capacitor 123. A voltage across the capacitor 123 serves as the driving voltage. A series connection of the switch 124 and the output unit 125 is grounded, and is connected electrically to the voltage converter 120. The switch 124 is controlled by the control signal to switch between conduction and nonconduction. The output unit 125 outputs generates the output signal based on a current flowing through the switch 124. The voltage divider unit 126 is grounded and is connected electrically to the voltage converter 120 for generating the divided voltage signal.

The control signal generator module 13 is connected electrically to the voltage converter circuit 12 for receiving the divided voltage signal, the output signal and the driving voltage. When the driving voltage reaches a predetermined start-up voltage, the control signal generator module 13 generates the control signal based on the divided voltage signal, the output signal and the driving voltage, and outputs the control signal to the switch 124.

The conventional switching power converter 1 has the following disadvantages:

1. Longer time is required for start-up. Since resistance of the resistors 121 and 122 is relatively high, the current flowing through the resistors 121 and 122 is relatively small, such that when the capacitor 123 is charged by the current flowing through the resistors 121 and 122, about one to three seconds are required to enable a voltage across the capacitor 123 (i.e., the driving voltage) to reach the predetermined start-up voltage. Therefore, longer time is required for the switching power converter 1 to start up.

2. More power is required by the conventional switching power converter 1. Since an overall resistance of the resistors 121 and 122 is around 0.3 M ohms, power P consumed by the resistors 121 and 122 is equivalent to a product of a voltage V across the resistors 121 and 122, and the current I flowing through the resistors 121 and 122 (i.e., P=I×V), the conventional switching power converter 1 consumes more power owing to the resistors 121 and 122.

SUMMARY OF THE INVENTION

Therefore, an object of the present invention is to provide a soft-start switching power converter which requires a shorter start-up time.

According to a first aspect, the soft-start switching power converter of the present invention comprises a rectifier circuit, a voltage converting circuit and a soft-start circuit.

The rectifier circuit receives an alternating-current (AC) voltage and rectifies the AC voltage so as to generate a rectified voltage.

The voltage converting circuit includes a transformer, a first switch and a first resistor.

The transformer includes a primary winding, a first secondary winding and a second secondary winding, each of which includes a dotted end and a non-dotted end. The non-dotted end of the primary winding is connected to the rectifier circuit for receiving the rectified voltage therefrom.

The first switch includes a first terminal that is connected electrically to the dotted end of the primary winding, a second terminal that provides a trigger signal, and a control terminal that receives a control signal. The first switch is controlled by the control signal to switch between conduction and nonconduction. A magnitude of the trigger signal is associated with the rectified voltage when the first switch is conducting. The second secondary winding, based on the conduction and nonconduction of the first switch and a turns ratio of the primary winding to the second secondary winding, generates an induced current that is associated with the rectified voltage. The voltage converting circuit generates a feedback voltage according to the induced current.

The first resistor is connected electrically to the primary winding and the control terminal of the first switch.

The soft-start circuit is connected electrically to the second terminal of the first switch for receiving the trigger signal, and generates the control signal according to the trigger signal. The soft-start circuit determines, during a start-up period, whether or not to clamp a voltage level of the control signal at a preset voltage level based on whether a voltage level of the trigger signal is greater than a preset value, so as to turn off the first switch. The start-up period is proportional to a period of time required for the feedback voltage to increase to a preset starting voltage.

When the voltage level of the control signal is not clamped at the preset voltage level during the start-up period, the voltage level of the control signal rises from the preset voltage level.

According to a second aspect, the soft-start switching power converter of the present invention comprises a rectifier circuit, a voltage converting circuit, a voltage divider circuit and a soft-start circuit.

The rectifier circuit receives an AC voltage and rectifies the AC voltage so as to generate a rectified voltage.

The voltage converting circuit includes a transformer, a first switch and a first resistor.

The transformer includes a primary winding, a first secondary winding and a second secondary winding, each of which includes a dotted end and a non-dotted end. The non-dotted end of the primary winding is connected to the rectifier circuit for receiving the rectified voltage therefrom.

The first switch includes a first terminal that is connected electrically to the dotted end of the primary winding, a second terminal, and a control terminal that receives a control signal. The first switch is controlled by the control signal to switch between conduction and nonconduction. The second secondary winding, based on the conduction and nonconduction of the first switch and a turns ratio of the primary winding to the second secondary winding, generates an induced current that is associated with the rectified voltage. The voltage converting circuit generates a feedback voltage according to the induced current.

The first resistor is connected electrically to the primary winding and the control terminal of the first switch.

The voltage divider circuit is grounded, is connected electrically to the control terminal of the first switch, and divides the control signal so as to generate a divided voltage signal.

The soft-start circuit is connected electrically to the control terminal of the first switch, and to the voltage divider circuit for receiving the divided voltage signal therefrom, and generates the control signal based on the divided voltage signal. The soft-start circuit adjusts, during a start-up period, a voltage level of the control signal based on a voltage level of the divided voltage signal so as to control the first switch to switch between conduction and nonconduction. The start-up period is proportional to a period of time required for the feedback voltage to increase to a preset starting voltage.

BRIEF DESCRIPTION OF THE DRAWINGS

Other features and advantages of the present invention will become apparent in the following detailed description of four preferred embodiments with reference to the accompanying drawings, of which.

DETAILED DESCRIPTION OF THE PREFERRED EMBODIMENTS

Figure 1:
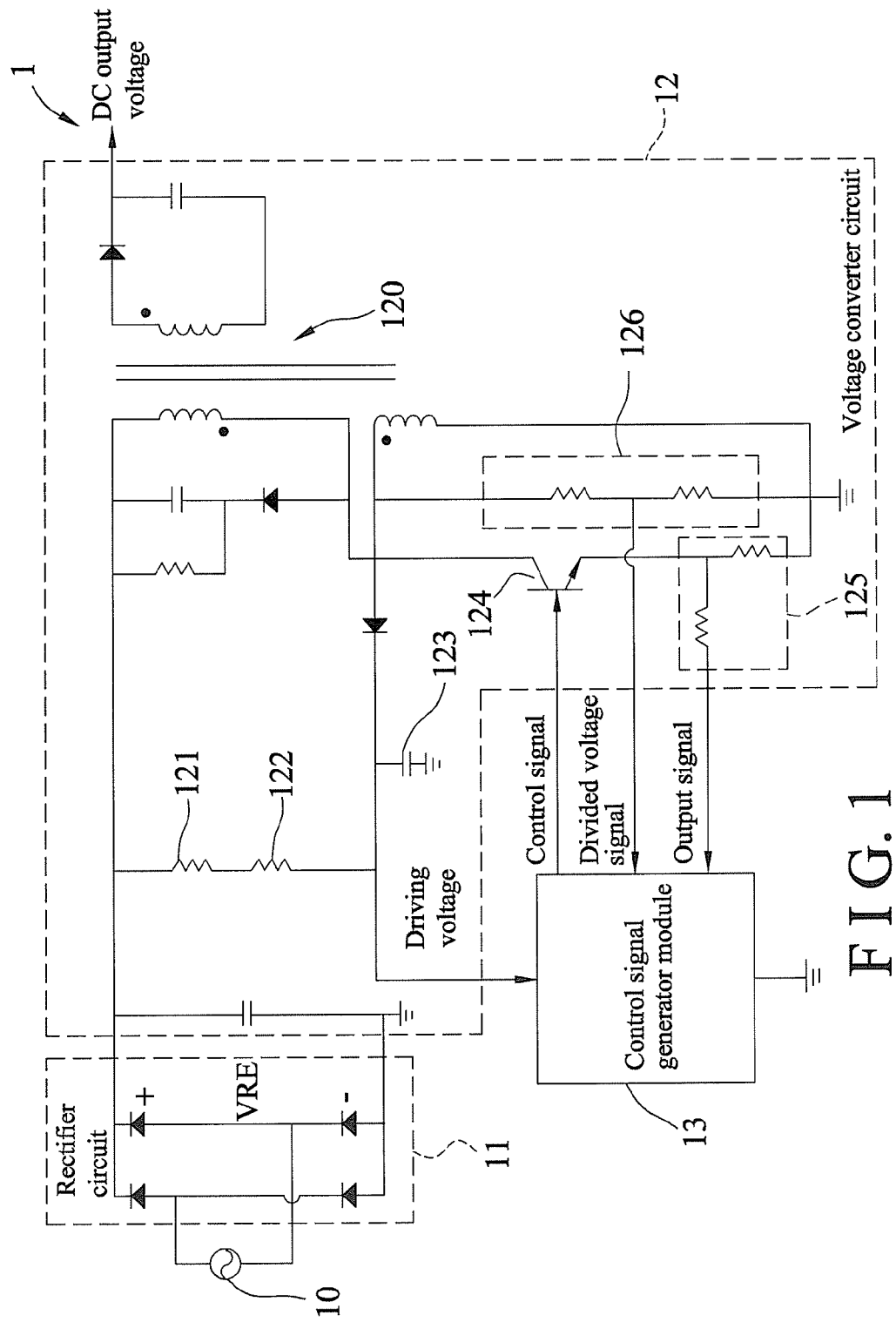
FIG. 1 is a circuit diagram illustrating a conventional switching power converter.

Before the present invention is described in greater detail with reference to the preferred embodiments, it should be noted herein that like elements are denoted by the same reference numerals throughout the following description.

Figure 2:
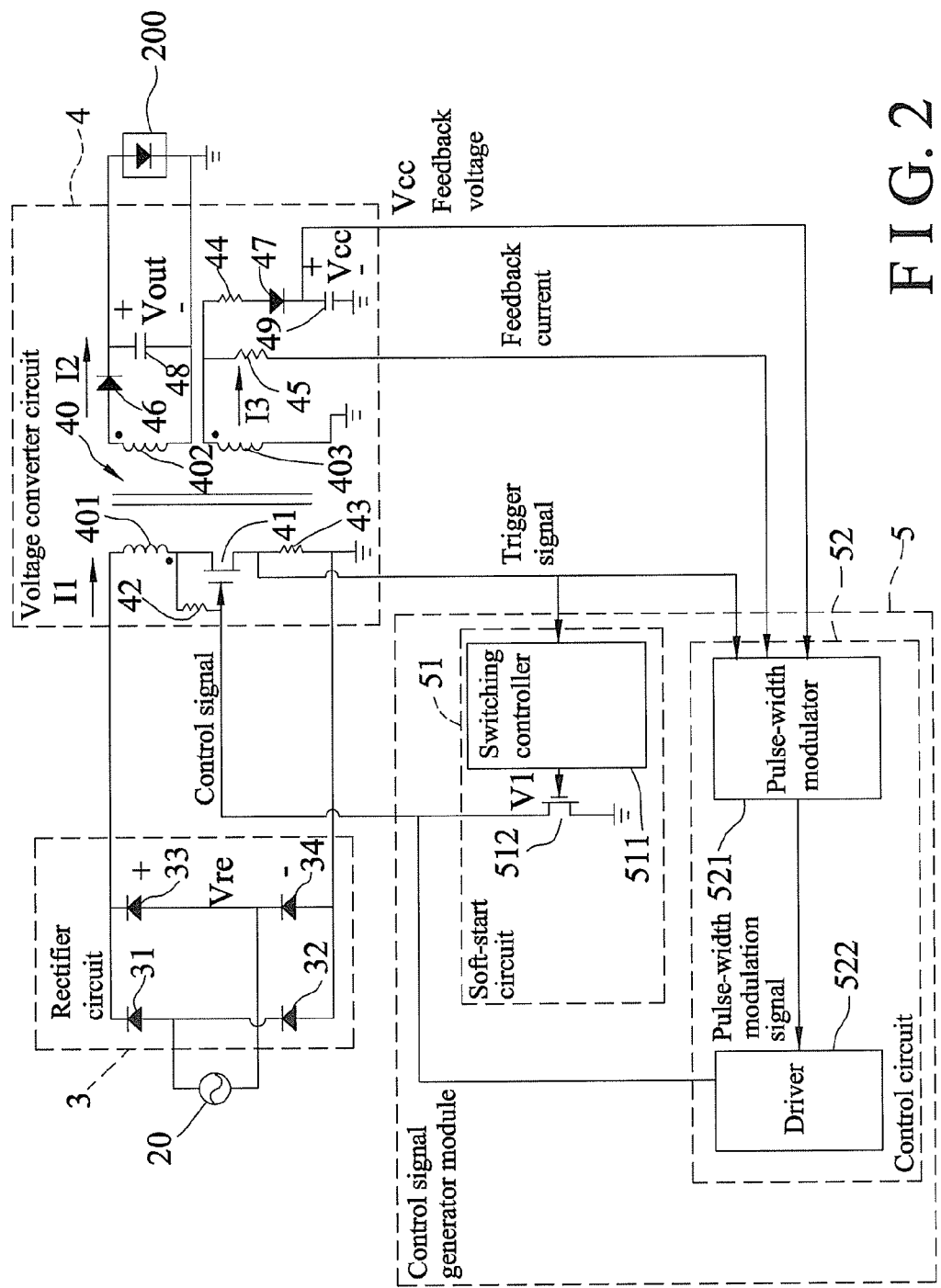
FIG. 2 is a circuit diagram illustrating a first preferred embodiment of a soft-start switching power converter of the present invention.

Referring to FIG. 2, a first preferred embodiment of a soft-start switching power converter according to the present invention is adapted to be connected electrically to an alternating-current (AC) power source 20 for receiving an AC voltage from the AC power source 20, and converts the AC voltage into a direct-current (DC) output voltage Vout that is provided to a light-emitting diode (LED) module 200 serving as a load of the soft-start switching power converter. The soft-start switching power converter comprises a rectifier circuit 3, a voltage converting circuit 4 and a control signal generation module 5.

The rectifier circuit 3 receives the AC voltage from the AC power source 20, and rectifies the AC voltage so as to generate a rectified voltage Vre. In this embodiment, the rectifier circuit 3 includes a full-bridge rectifier that has four diodes 31 to 34, and the rectified voltage Vre is a voltage across the diodes 33 and 34.

The voltage converting circuit 4 is connected electrically between the rectifier circuit 3 and the LED module 200, and receives the rectified voltage Vre from the rectifier circuit 3. The voltage converting circuit 4 adjusts the DC output voltage Vout based on the rectified voltage Vre and a control signal, outputs the DC output voltage Vout to the LED module 200, and generates a trigger signal, a feedback current and a feedback voltage Vcc. In this embodiment, the voltage converting circuit 4 includes a transformer 40, a first switch 41, first to fourth resistors 42 to 45, first and second diodes 46 and 47, and first and second capacitors 48 and 49.

The transformer 40 includes a primary winding 401, a first secondary winding 402 and a second secondary winding 403, each of which includes a dotted end and a non-dotted end. The non-dotted end of the primary winding 401 is connected electrically to the rectifier circuit 3 for receiving the rectified voltage Vre therefrom. Each of the non-dotted ends of the first and second secondary windings 402 and 403 is grounded.

The first switch 41 includes a first terminal that is connected electrically to the dotted end of the primary winding 401, a second terminal that provides the trigger signal, and a control terminal that receives the control signal. The first switch 41 is controlled by the control signal to switch between conduction and nonconduction. A magnitude of the trigger signal is associated with the rectified voltage Vre when the first switch 41 is conducting. The first resistor 42 is connected electrically between the dotted-end of the primary winding 401 and the control terminal of the first switch 41. The second resistor 43 is grounded and is connected electrically to the second terminal of the first switch 41. A voltage across the second resistor 43 serves as the trigger signal. The first diode 46 has an anode connected electrically to the dotted end of the first secondary winding 402, and a cathode. The first capacitor 48 is connected electrically between the cathode of the first diode 46 and the non-dotted end of the first secondary winding 402. A series connection of the third resistor 44, the second diode 47 and the second capacitor 49 is grounded and is connected electrically to the dotted end of the second secondary winding 403. The second diode 47 has an anode connected electrically to the third resistor 44, and a cathode connected electrically to the second capacitor 49. The fourth resistor 45 is connected electrically to the dotted end of the second secondary winding 403.

The voltage converting circuit 4 operates to generate, based on the control signal, a primary current I1 that flows through the primary winding 401, a first secondary current I2 that flows through the first secondary winding 402, and a second secondary current I3 that flows through the second secondary winding 403. Specifically, when the first switch 41 is controlled by the control signal to switch to conduction, the primary current I1 flows through the primary winding 401. When the first switch 41 is controlled by the control signal to switch to nonconduction, each of the first and second secondary windings 402 and 403, based on switching between conduction and nonconduction of the first switch 41 and a respective one of a turns ratio of the primary winding 401 to the first secondary winding 402 and a turns ratio of the primary winding 401 to the second secondary winding 403, generates an induced current that is associated with the rectified voltage Vre (i.e., one of the first secondary current I2 flowing through the first secondary winding 402 and the second secondary current I3 flowing through the second secondary winding 403). The voltage converting circuit 4 generates the feedback voltage Vcc according to the induced current. The first secondary current I2 flows through the first capacitor 48 such that the first capacitor 48 is charged according to the first secondary current I2. A voltage across the first capacitor 48 serves as the DC output voltage Vout, so that the DC output voltage Vout is associated with the first secondary current I2. A portion of the second secondary current I3 flows through the fourth resistor 45, and said portion of the second secondary current I3 serves as the feedback current. That is to say, the feedback current is associated with the second secondary current I3. Another portion of the second secondary current I3 flows though the third resistor 44, the second diode 47 and the second capacitor 49, such that the second capacitor 49 is charged according to said another portion of the second secondary current I3. A voltage across the second capacitor 49 serves as the feedback voltage Vcc, so that the feedback voltage Vcc is associated with the second secondary current I3.

The control signal generation module 5 is connected electrically to the voltage converting circuit 4 for receiving the trigger signal, the feedback current and the feedback voltage therefrom, and generates the control signal according to the trigger signal, the feedback current and the feedback voltage. The control signal generation module 5 subsequently outputs the control signal to the control terminal of the first switch 41 of the voltage converting circuit 4. In this embodiment, the control signal generation module 5 includes a soft-start circuit 51 and a control circuit 52.

The soft-start circuit 51 is connected electrically to the second terminal of the first switch 41 for receiving the trigger signal, and generates the control signal according to the trigger signal. The soft-start circuit 51 determines, during a start-up period, whether or not to clamp a voltage level of the control signal at a preset voltage level based on whether a voltage level of the trigger signal is greater than a preset value, so as to turn off the first switch 41. Further, when the voltage level of the control signal is not clamped at the preset voltage level during the start-up period, the voltage level of the control signal rises from the preset voltage level. The start-up period is proportional to a period of time required for the feedback voltage to increase to a preset starting voltage. The soft-start circuit 51 includes a switching controller 511 and a starter switch 512.

Figure 3:
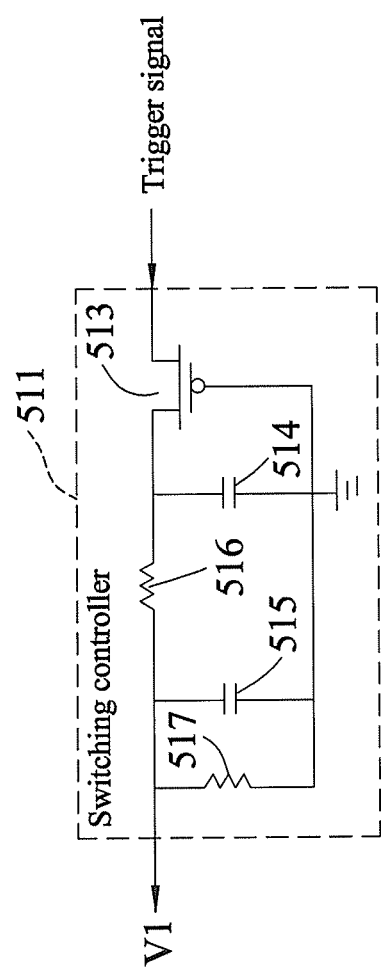
FIG. 3 is a circuit diagram illustrating a switching controller of the first preferred embodiment.

Referring to FIG. 2 and FIG. 3, the switching controller 511 is connected electrically to the voltage converting circuit 4 for receiving the trigger signal, and generates a switching signal V1 based on the trigger signal. In this embodiment, the switching controller 511 includes a second switch 513, a first starter capacitor 514, a second starter capacitor 515, a first starter resistor 516, and a second starter resistor 517.

In this embodiment, a voltage required for turning on the second switch 513 serves as the preset value.

The second switch 513 has a first terminal connected electrically to the voltage converting circuit 4 for receiving the trigger signal, a second terminal, and a control terminal which is grounded. The second switch 513 is controlled by the trigger signal to switch between conduction and nonconduction. The first starter capacitor 514 is connected electrically between the second terminal of the second switch 513 and the control terminal of the second switch 513. The first starter resistor 516 has one end connected electrically to the second terminal of the second switch 513. A parallel connection of the second starter capacitor 515 and the second starter resistor 517 is connected electrically between another end of the first starter resistor 516 and the control terminal of the second switch 513. A voltage across the second starter resistor 517 serves as the switching signal V1. It is noted that dispositions of the first and second starter capacitors 514 and 515 may prevent the switching signal V1 from varying immediately with change in the trigger signal, and may delay the switching signal V1 for a period of time before any variation, such that the trigger signal may not cause the starter switch 512 to switch instantly. Moreover, when the switching controller 511 generates the switching signal V1 based on the trigger signal and turns on the starter switch 512, a voltage at the control terminal of the first switch 41 drops to zero.

The starter switch 512 has a first terminal which is connected electrically to the control terminal of the first switch 41 of the voltage converting circuit 4 and which outputs the control signal, a second terminal which is grounded, and a control terminal which is connected electrically to the second starter resistor 517 of the switching controller 511 for receiving the switching signal V1. The starter switch 512 is controlled by the switching signal V1 to switch between conduction and nonconduction.

The control circuit 52 is connected electrically to the voltage converting circuit 4 for receiving the trigger signal, the feedback current and the feedback voltage Vcc, generates the control signal based on the trigger signal, the feedback current and the feedback voltage Vcc, and outputs the control signal to the control terminal of the first switch 41 of the voltage converting circuit 4. In this embodiment, the control circuit 52 includes a pulse-width modulator 521 and a driver 522.

The pulse-width modulator 521 is connected electrically to the voltage converting circuit 4 for receiving the trigger signal, the feedback current and the feedback voltage Vcc, and generates a pulse-width modulation signal based on the trigger signal, the feedback current and the feedback voltage Vcc. The driver 522 is connected electrically to the pulse-width modulator 521 for receiving the pulse-width modulation signal therefrom, and generates the control signal based on the pulse-width modulation signal.

Figure 4:
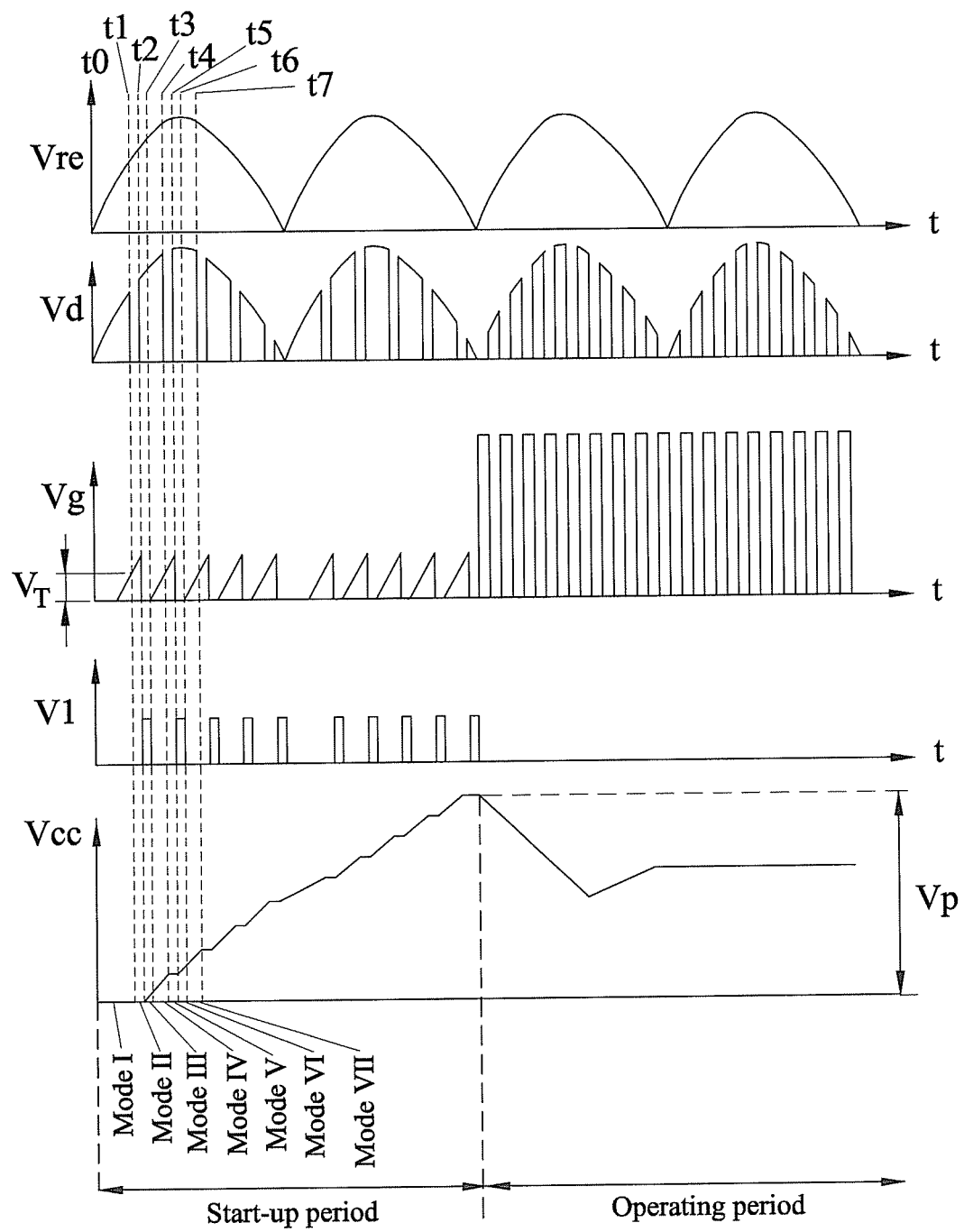
FIG. 4 is a timing diagram illustrating a start-up period of the first preferred embodiment.

Referring to FIG. 2 and FIG. 4, a parameter Vd denotes a voltage at the first terminal of the first switch 41, a parameter Vg denotes the voltage at the control terminal of the first switch 41, the parameter V1 denotes a voltage at the control terminal of the starter switch 512 (i.e., a voltage of the switching signal V1), the parameter Vcc denotes the feedback voltage, a parameter $V_T$ denotes the voltage required for turning on the first switch 41 (i.e., a threshold voltage of the first switch 41), and the parameter Vp denotes the preset starting voltage.

Operation of the voltage converting circuit 4 of the first preferred embodiment, and a sequence of operations of the soft-start circuit 51 and the control circuit 52 are explained hereinafter.

Mode I (t0-t1):

The first switch 41 and the starter switch 512 are nonconducting, such that the voltage Vd at the first terminal of the first switch 41 rises as the rectified voltage Vre rises. A current flowing through the first resistor 42 charges a parasitic capacitor (not shown) of the first switch 41 so that the voltage Vg at the control terminal of the first switch 41 (i.e., a voltage across the parasitic capacitor) rises linearly.

At this moment, since the first switch 41 is nonconducting, and the first switch 41 does not switch between conduction and nonconduction, the transformer 40 is not able to generate, by virtue of electromagnetic induction, the first and second secondary currents I2 and I3 which flow through the first and second secondary windings 402 and 403, respectively. Therefore, the feedback voltage Vcc is kept at zero.

Mode II (t1-t2):

The first switch 41 is conducting, and the starter switch 512 remains nonconducting. The reason resides in that, in Mode I, the first switch 41 is nonconducting, and a voltage Vs at the second terminal of the first switch 41 is at zero, such that the voltage Vg at the control terminal of the first switch 41 rises gradually. When a voltage difference Vgs between the control terminal of the first switch 41 and the second terminal of the first switch 41 (i.e., Vgs=Vg−Vs=Vg) is greater than the threshold voltage $V_T$ of the first switch 41, the first switch 41 is conducting so that the voltage Vd at the first terminal of the first switch 41 drops to zero. Meanwhile, the voltage Vg at the control terminal of the first switch 41 continues to rise.

At this moment, the voltage converting circuit 4 generates the primary current I1 flowing through the primary winding 401. Moreover, since the transformer 40 is not induced to generate the second secondary current I3, the feedback voltage Vcc is still kept at zero.

Mode III (t2-t3):

The first switch 41 is nonconducting, and the starter switch 512 is conducting. The reason resides in that, in Mode II, the first switch 41 is conducting, such that the voltage across the second resistor 43 (i.e., the trigger signal) rises. As a result, in Mode III, the switching controller 511 generates the switching signal V1 based on the determination that the voltage level of the trigger signal is greater than the preset value, so that the starter switch 512 is controlled by the switching signal V1 to switch to conduction and adjusts the output signal outputted by the starter switch 512. Meanwhile, the first switch 41 is controlled by the control signal such that the voltage at the control terminal of the first switch 41 drops to zero, and the first switch 41 is thus switched to nonconduction.

At this moment, the voltage Vd at the first terminal of the first switch 41 rises as the rectified voltage Vre rises. Further, since the first switch 41 is switched from conduction to nonconduction, the transformer 40 generates the first and second secondary currents I2 and I3 associated with the primary current I1 according to the electromagnetic induction. Magnitudes of the first and second secondary currents I2 and I3 are associated with the turns ratio of the primary winding 401 to the first secondary winding 402 and the turns ratio of the primary winding 401 to the second secondary winding 403, respectively. The first capacitor 48 is charged according to the first secondary current I2 so as to adjust the DC output voltage Vout. The second capacitor 49 is charged according to said another portion of the second secondary current I3, and thus the feedback voltage Vcc is caused to rise.

Mode IV (t3-t4):

Mode IV is similar to Mode I, and differs from Mode I in that, the second capacitor 49 in this mode continues to be charged according to said another portion of the second secondary current I3 so that the feedback voltage Vcc continues to rise.

Mode V (t4-t5):

Mode V is similar to Mode II, and differs from Mode II in that, the transformer 40 in this mode does not generate the second secondary current I3 according to the electromagnetic induction such that the feedback voltage Vcc stops varying and remains at a voltage level.

Mode VI (t5-t6):

Since Mode VI is similar to Mode III, a description of detailed operations in this mode is not repeated for the sake of brevity.

Mode VII (t6-t7):

Mode VII is similar to Mode IV, and a new cycle is started. At the same time, the feedback voltage Vcc keeps rising.

It is noted that during a period when the feedback voltage Vcc is smaller than the preset stating voltage Vp (i.e., the start-up period illustrated in FIG. 4), the control circuit 52 of the control signal generation module 5 does not operate, and the soft-start circuit 51 of the control signal generation module 5 generates the control signal according to the trigger signal so as to control the first switch 41 to switch between conduction and nonconduction. After the feedback voltage Vcc has reached the preset starting voltage Vp (i.e., an operating period illustrated in FIG. 4), the soft-start circuit 51 stops operating, and the control circuit 52 generates the control signal based on the trigger signal, the feedback current and the feedback voltage Vcc so as to control the first switch 41 to switch between conduction and nonconduction. The voltage converting circuit 4, by means of the control signal generated by the control signal generation module 5, generates the first and second secondary currents I2 and I3 at the first and second secondary windings 402 and 403, respectively. In this way, the voltage converting circuit 4 adjusts the voltage of the DC output voltage Vout based on the first secondary current I2, and adjusts the feedback voltage Vcc based on said portion of the second secondary current I3.

Moreover, in this embodiment, each of the first switch 41 and the starter switch 512 is an N-type metal-oxide-semiconductor field-effect transistor (MOSFET), which has a drain terminal, a source terminal and a gate terminal corresponding respectively to the first terminal, the second terminal and the control terminal of a respective one of the first switch 41 and the starter switch 512. The second switch 513 is a P-type MOSFET, which has a source terminal, a drain terminal and a gate terminal corresponding respectively to the first terminal, the second terminal and the control terminal of the second switch 513.

Figure 5:
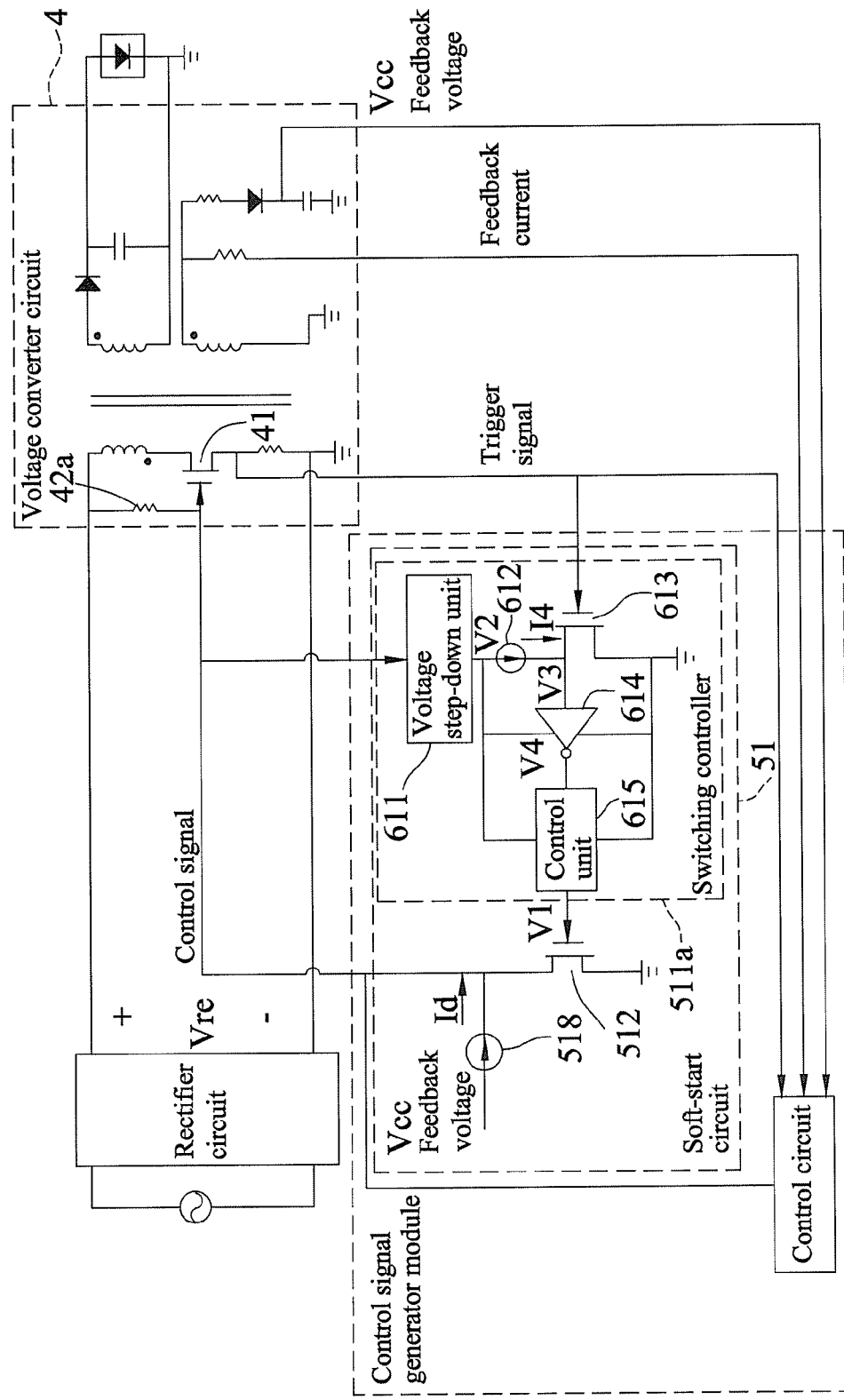
FIG. 5 is a circuit diagram illustrating a second preferred embodiment of the soft-start switching power converter of the present invention.

Referring to FIG. 5, a second preferred embodiment of the soft-start switching power converter according to the present invention is illustrated. The second preferred embodiment is similar to the first preferred embodiment, and differs from the first preferred embodiment in that a first resistor 42a and a switching controller 511a are adopted instead of the first resistor 42 and the switching controller 511 in the first preferred embodiment (see FIG. 2). Moreover, the soft-start circuit 51 further includes an adjusting current source 518.

The first resistor 42a is connected electrically between the non-dotted end of the primary winding 401 and the control terminal of the first switch 41. The adjusting current source 518 is connected electrically to the first terminal of the starter switch 512, receives the feedback voltage Vcc from the voltage converting circuit 4, and generates an adjusting current Id based on the feedback voltage Vcc. The switching controller 511a is further connected electrically to the control terminal of the first switch 41 of the voltage switching converting circuit 4 for receiving the control signal. In this embodiment, the switching controller 511a includes a voltage step-down unit 611, a current source 612, a third switch 613, an inverter 614 and a control unit 615.

The voltage step-down unit 611 is connected electrically to the control terminal of the first switch 41 for receiving the control signal and a portion of the adjusting current Id, and generates an operating voltage V2 based on the control signal and the portion of the adjusting current Id received thereby. The current source 612 is connected electrically to the voltage step-down unit 611 for receiving the operating voltage V2, and generates a current signal I4 based on the operating voltage V2. The third switch 613 has a first terminal which is connected electrically to the current source 612 for receiving the current signal I4, a second terminal which is grounded, and a control terminal which is connected electrically to the second terminal of the first switch 41 for receiving the trigger signal. The third switch 613 is controlled by the trigger signal to switch between conduction and nonconduction, and outputs an adjust signal V3 at the first terminal of the third switch 613. The inverter 614 includes a first terminal which is connected electrically to the voltage step-down unit 611 for receiving the operating voltage V2, a second terminal which is grounded, an input terminal which is connected electrically to the first terminal of the third switch 613 for receiving the adjust signal V3, and an output terminal which provides an output signal V4 that has a logic level opposite to that of the adjust signal V3. The control unit 615 is connected electrically to the voltage step-down unit 611 and the inverter 614 for receiving the operating voltage V2 from the voltage step-down unit 611 and the output signal V4 from the inverter 614, and generates a switching signal V1 based on the output signal V4.

During the start-up period, when the first switch 41 is conducting, the voltage level of the trigger signal is rising. When the voltage level of the trigger signal rises to be greater than the preset value (i.e., a voltage required for turning on the third switch 613), the third switch 613 is controlled by the trigger signal to switch to conduction. At this moment, the adjust signal V3 outputted at the first terminal of the third switch 613 is a low logic level signal, such that the output signal V4 outputted by the inverter 614 is a high logic level signal. The control unit 615 outputs the switching signal V1 that has a high logic level based on the output signal V4 so as to turn on the starter switch 512. The control signal outputted by the starter switch 512 cause the voltage at the control terminal of the first switch to drop to zero, such that the first switch 41 is switched from conduction to nonconduction.

On the other hand, during the start-up period, when the first switch 41 is nonconducting, the voltage level of the trigger signal drops to zero, such the third switch 613 is controlled by the trigger signal to switch from conduction to nonconduction. At this moment, the current signal I4 passing through the first terminal of the third switch 613 may cause the adjust signal V3 to be a high logic level signal, such that the output signal V4 outputted by the inverter 614 is a low logic level signal. The control unit 615 outputs the switching signal V1 that has a low logic level based on the output signal V4 so as to turn off the starter switch 512. The voltage at the control terminal of the first switch 41 starts to rise based on the adjusting current Id or variation associated with the rectified voltage Vre, so that the first switch 41 is switched from nonconduction to conduction. Subsequently, the aforementioned operations during which the first switch 41 is conducting are repeated so as to adjust the DC output voltage Vout and the feedback voltage Vcc.

In this way, the second preferred embodiment may achieve the same effect of the first preferred embodiment. Further, when the resistance of the first resistor 42a is relatively large, the voltage at the control terminal of the first switch 41 rises slowly, that is to say, more time may be required for the voltage difference Vgs between the control terminal of the first switch 41 and the second terminal of the first switch 41 to reach or exceed the threshold voltage $V_T$ of the first switch 41. Therefore, more time may be required for the first switch 41 to switch between conduction and nonconduction. However, in this embodiment, since the adjusting current source 518 is capable of generating the adjusting current Id that is outputted to the first switch 41, the voltage at the control terminal of the first switch 41 may be further adjusted according to the adjusting current Id. As a result, when the resistance of the first resistance 42a is relatively large, the time required for the first switch 41 to switch between conduction and nonconduction may be reduced. Therefore, the second preferred embodiment is capable of promoting the switching efficiency of the first switch 41.

Figure 6:
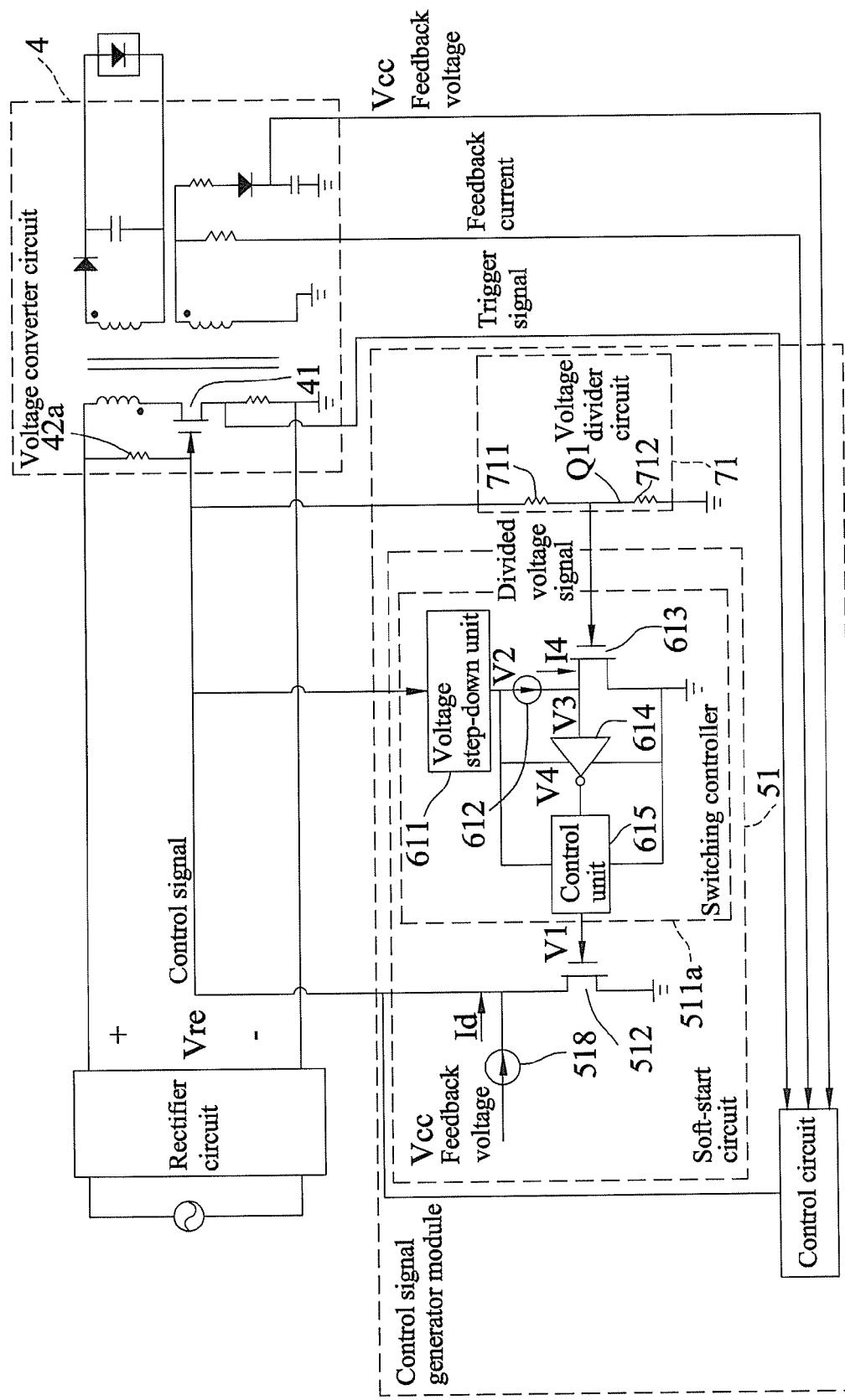
FIG. 6 is a circuit diagram illustrating a third preferred embodiment of the soft-start switching power converter of the present invention.

Referring to FIG. 6, a third preferred embodiment of the soft-start switching power converter according to the present invention is illustrated. The third preferred embodiment is similar to the second preferred embodiment, and differs from the second preferred embodiment in that the control signal generation module 5 further includes a voltage divider circuit 71. The switching controller 511a is connected electrically to the voltage divider circuit 71, instead of being connected electrically to the second terminal of the first switch 41 of the voltage converting circuit 4 in the second preferred embodiment (see FIG. 5).

The voltage divider circuit 71 is grounded, is connected electrically to the control terminal of the first switch 41, receives the control signal from the starter switch 512 and another portion of the adjusting current Id from the adjusting current source 518, and divides the control signal so as to generate a divided voltage signal. The voltage divider circuit 71 includes a series connection of two resistors 711 and 712. A voltage across the resistor 712 serves as the divided voltage signal. The control terminal of the third switch 613 of the switching controller 511a is connected electrically to a junction Q1 of the two resistors 711 and 712 for receiving the divided voltage signal. The third switch 613 is controlled by the divided voltage signal to switch between conduction and nonconduction.

It is noted that, during the start-up period, when the rectified voltage Vre rises gradually from zero, the voltage level of the control signal varies according to the rectified voltage Vre. When the voltage level of the control signal is greater than the threshold voltage $V_T$ of the first switch 41, the first switch 41 is conducting, and the voltage level of the control signal continues to follow the rectified voltage Vre while the rectified voltage Vre is rising. When the control signal rises to an extent that a voltage level of the divided voltage signal is greater than the voltage required for turning on the third switch 613, the third switch 613 is switched to conduction. The switching controller 511a outputs the switching signal V1 that has a high logic level, such that the starter switch 512 is switched to conduction. Since operations of the switching controller 511a are similar to those illustrated in the second preferred embodiment, detailed descriptions thereof are omitted herein for the sake of brevity. At this moment, the voltage level of the control signal outputted by the starter switch 512 drops to zero (i.e., the voltage at the control terminal of the first switch 41 drops to zero), so that the first switch 41 is switched from conduction to nonconduction. Since the voltage level of the control signal is zero, the voltage level of the divided voltage signal is smaller than the voltage required for turning on the third switch 613, such that the third switch 613 is switched from conduction to nonconduction. The switching controller 511a outputs the switching signal V1 that has a low logic level, so as to turn off the starter switch 512.

When the starter switch 512 is nonconducting, the voltage level of the control signal follows the rectified voltage Vre. While the voltage level of the control signal rises to an extent that the first switch 41 is conducting, the aforementioned operations during which the first switch 41 is conducting are repeated so as to adjust the DC output voltage Vout and the feedback voltage Vcc. In simple terms, the soft-start circuit 51 of this embodiment determines, during the start-up period, whether or not to clamp the voltage level of the control signal at the preset voltage level (i.e., the zero voltage level) based on whether the voltage level of the divided voltage signal is greater than the preset value (i.e., the voltage required for turning on the third switch 613), so as to turn off the first switch 41.

Figure 7:
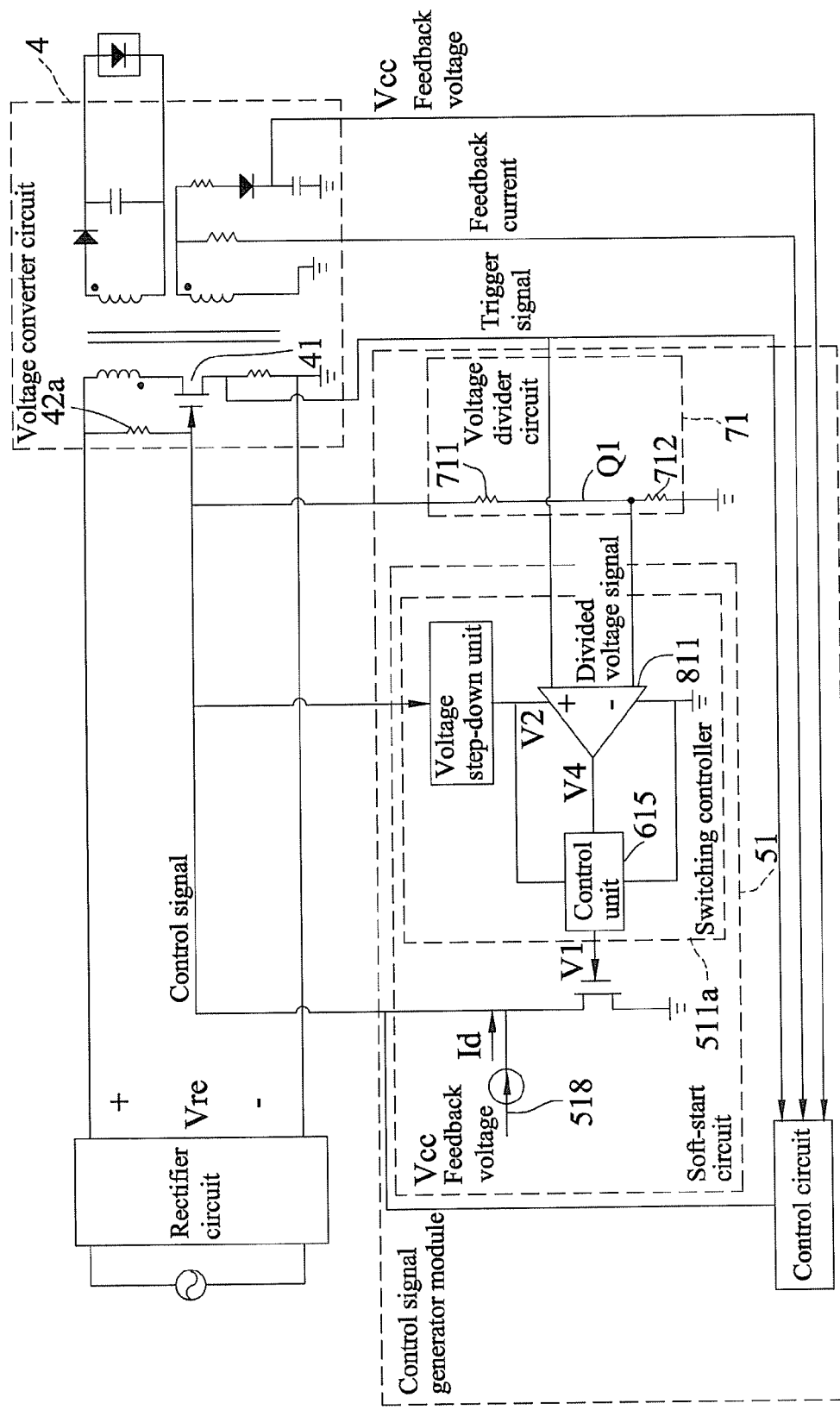
FIG. 7 is a circuit diagram illustrating a fourth preferred embodiment of the soft-start switching power converter of the present invention.

Referring to FIG. 7, a fourth preferred embodiment of the soft-start switching power converter according to the present invention is illustrated. The fourth preferred embodiment is similar to the third preferred embodiment, and differs from the third preferred embodiment in that a comparator 811 is adopted in this embodiment instead of the current source 612, the third switch 613 and the inverter 614 of the switching controller 511a in the third preferred embodiment (see FIG. 6).

The comparator 811 has a first input connected electrically to the second terminal of the first switch 41 for receiving the trigger signal, a second input connected electrically to the junction Q1 of the two resistors 711 and 712 for receiving the divided voltage signal, and an output. In this embodiment, the first input is a non-inverting input, and the second input is an inverting input. The comparator 811 generates an output signal V4 at the output thereof based on the trigger signal and the divided voltage signal, and outputs the output signal V4 to the control unit 615.

During the start-up period, when the first switch 41 is conducting, the voltage level of the trigger signal is greater than the divided voltage signal such that the comparator 811 generates the output signal V4 which has a high logic level based on the trigger signal and the divided voltage signal. The control unit 615, based on the output signal V4, generates and outputs the switching signal V1 that has a high logic level, so as to turn on the starter switch 512. Meanwhile, the starter switch 512 outputs the control signal so that the voltage at the control terminal of the first switch 41 drops. As a result, the first switch 41 is switched from conduction to nonconduction.

On the other hand, during the start-up period, when the first switch 41 is nonconducting, the voltage level of the trigger signal is smaller than the divided voltage signal such that the comparator 811 generates the output signal V4 which has a low logic level. The control unit 615, based on the output signal V4, generates and outputs the switching signal V1 that has a low logic level, so as to turn off the starter switch 512. Meanwhile, the voltage at the control terminal of the first switch 41 starts rising based on the adjusting current Id or the variation associated with the rectified voltage Vre, such that the first switch 41 is switched from nonconduction to conduction. In simple terms, the soft-start circuit 51 of this embodiment determines, during the start-up period, whether or not to clamp the voltage level of the control signal at the preset voltage level based on whether the voltage level of the trigger signal is greater than the voltage level of the divided voltage signal, so as to turn off the first switch 41.

In addition, since other operational procedures in the fourth preferred embodiment are similar to those in the third preferred embodiment, detailed descriptions of the same are not repeated herein.

Figure 8:
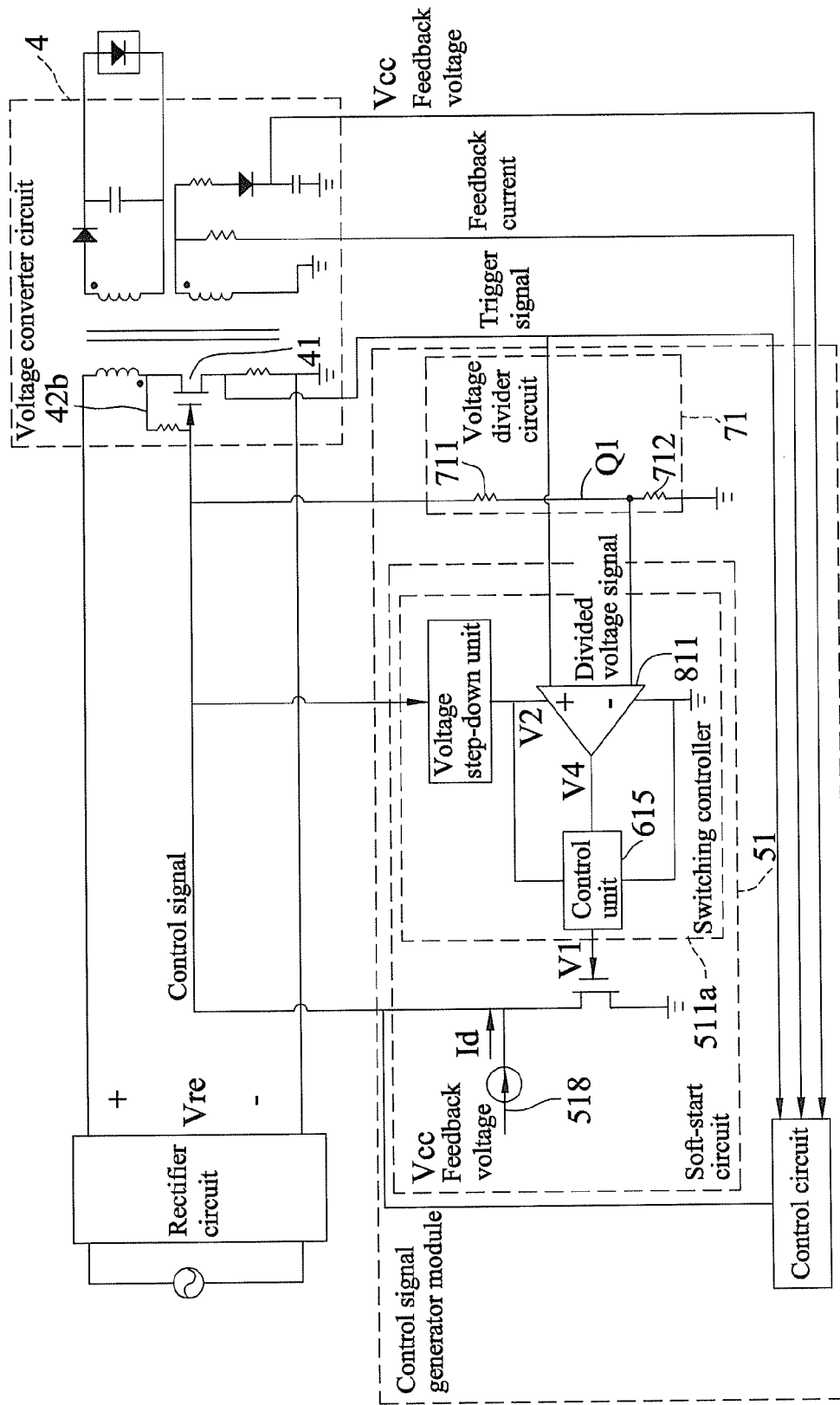
FIG. 8 is a circuit diagram illustrating a modification of the fourth preferred embodiment.

Referring to FIG. 8, a modification of the fourth preferred embodiment is illustrated. In this modification, a first resistor 42b is adopted to replace the first resistor 42a of the fourth preferred embodiment. The first resistor 42b is connected electrically between the dotted end of the primary winding 401 and the control terminal of the first switch 41. Since operational procedures of this modification are similar to those of the fourth preferred embodiment, detailed descriptions of the same are not repeated herein.

To sum up, the aforementioned preferred embodiments have the following advantages:

1. Less time is required for start-up. By means of switching the first switch 41 between conduction and nonconduction, the second capacitor 49 may be charged by the current flowing through the third resistor 44 and the second diode 47. Since resistance of the third resistor 44 and the second diode 47 is smaller than resistance of the resistors 121 and 122 of the conventional switching power converter (see FIG. 1), the current flowing through the third resistor 44 and the second diode 47 is greater than the current flowing through the resistors 121 and 122, such that merely 0.1 second is required for the voltage across the second capacitor 49 (i.e., the feedback voltage Vcc) to reach the preset starting voltage Vp. In this way, less start-up time is required by the soft-start switching power converter.

2. Less power is required. Since resistance of each of the first resistors 42, 42a and 42b is about 5 M Ohms, the current flowing through each of the first resistors 42, 42a and 42b is relatively low. Moreover, power P consumed by each of the first resistors 42, 42a and 42b is equivalent to a product of a voltage V across a respective one of the first resistors 42, 42a and 42b, and the current I flowing through a corresponding one of the first resistors 42, 42a and 42b (i.e., P=I×V), so that less power is consumed by each of the first resistors 42, 42a and 42b in the soft-start switching power converter.

3. Less time is required for switching. Since the adjusting current source 518 is configured to provide the adjusting current Id to the first switch 41 of the voltage converting circuit 4, switching of the first switch 41 may be prevented from being delayed due to the large resistance of the first resistors 42a and 42b.

While the present invention has been described in connection with what are considered the most practical and preferred embodiments, it is understood that this invention is not limited to the disclosed embodiments but is intended to cover various arrangements included within the spirit and scope of the broadest interpretation so as to encompass all such modifications and equivalent arrangements.

What is claimed is:

1. A soft-start switching power converter comprising:
a rectifier circuit which receives an alternating-current (AC) voltage and which rectifies the AC voltage so as to generate a rectified voltage;
a voltage converting circuit which includes
a transformer including a primary winding, a first secondary winding and a second secondary winding, each of which includes a dotted end and a non-dotted end, the non-dotted end of said primary winding being connected to said rectifier circuit for receiving the rectified voltage therefrom,
a first switch including a first terminal that is connected electrically to the dotted end of said primary winding, a second terminal that provides a trigger signal, and a control terminal that receives a control signal, said first switch being controlled by the control signal to switch between conduction and nonconduction, a magnitude of the trigger signal being associated with the rectified voltage when said first switch is conducting, said second secondary winding, based on the conduction and nonconduction of said first switch and a turns ratio of said primary winding to said second secondary winding, generating an induced current that is associated with the rectified voltage, said voltage converting circuit generating a feedback voltage according to the induced current, and
a first resistor connected electrically to said primary winding and the control terminal of said first switch; and
a soft-start circuit which is connected electrically to the second terminal of said first switch for receiving the trigger signal, and which generates the control signal according to the trigger signal, said soft-start circuit determining during a start-up period whether or not to clamp a voltage level of the control signal at a preset voltage level based on whether a voltage level of the trigger signal is greater than a preset value, so as to turnoff said first switch, wherein the start-up period is proportional to a period of time required for the feedback voltage to increase to a preset starting voltage;
wherein when the voltage level of the control signal is not clamped at the preset voltage level during the start-up period, the voltage level of the control signal rises from the preset voltage level.

2. The soft-start switching power converter according to claim 1, wherein said voltage converting circuit further includes:
a second resistor being grounded and being connected electrically to the second terminal of said first switch, a voltage across said second resistor serving as the trigger signal;
a first diode having an anode connected electrically to the dotted end of said first secondary winding, and a cathode;
a first capacitor connected electrically between the cathode of said first diode and the non-dotted end of said first secondary winding, a voltage across said first capacitor serving as a direct-current (DC) output voltage; and
a series connection of a third resistor, a second diode and a second capacitor, the series connection being grounded and being connected electrically to the dotted end of said second secondary winding, said second diode having an anode connected electrically to said third resistor, and a cathode connected electrically to said second capacitor, a voltage across said second capacitor serving as the feedback voltage.

3. The soft-start switching power converter according to claim 1, wherein said first resistor is connected electrically between the dotted end of said primary winding and the control terminal of said first switch.

4. The soft-start switching power converter according to claim 1, wherein said first resistor is connected electrically between the non-dotted end of said primary winding and the control terminal of said first switch.

5. The soft-start switching power converter according to claim 1, wherein said soft-start circuit includes:
a switching controller including
a second switch which has a first terminal connected electrically to said voltage converting circuit for receiving the trigger signal, a second terminal, and a control terminal which is grounded, said second switch being controlled by the trigger signal to switch between conduction and nonconduction,
a first starter capacitor which is connected electrically between the second terminal of said second switch and the control terminal of said second switch,
a first starter resistor having one end connected electrically to the second terminal of said second switch, and
a parallel connection of a second starter capacitor and a second starter resistor, said parallel connection being connected electrically between another end of said first starter resistor and the control terminal of said second switch, a voltage across said second starter resistor serving as a switching signal; and
a starter switch having a first terminal which is connected electrically to the control terminal of said first switch of said voltage converting circuit and which outputs the control signal, a second terminal which is grounded, and a control terminal which is connected electrically to said second starter resistor for receiving the switching signal, said starter switch being controlled by the switching signal to switch between conduction and nonconduction.

6. The soft-start switching power converter according to claim 1, wherein said soft-start circuit is further connected electrically to the control terminal of said first switch of said voltage converting circuit for receiving the control signal, and includes:
a switching controller including
a voltage step-down unit which is connected electrically to the control terminal of said first switch for receiving the control signal and which generates an operating voltage based on the control signal,
a current source which is connected electrically to said voltage step-down unit for receiving the operating voltage, and which generates a current signal based on the operating voltage,
a third switch which has a first terminal connected electrically to said current source for receiving the current signal, a second terminal being grounded, and a control terminal connected electrically to the second terminal of said first switch for receiving the trigger signal, said third switch being controlled by the trigger signal to switch between conduction and nonconduction, and outputting an adjust signal at the first terminal of said third switch,
an inverter which includes a first terminal connected electrically to said voltage step-down unit for receiving the operating voltage, a second terminal being grounded, an input terminal connected electrically to the first terminal of said third switch for receiving the adjust signal, and an output terminal providing an output signal that has a logic level opposite to that of the adjust signal, and a control unit which is connected electrically to said voltage step-down unit and said inverter for receiving the operating voltage from said voltage step-down unit and the output signal from said inverter, and which generates a switching signal based on the output signal; and a starter switch having a first terminal which is connected electrically to the control terminal of said first switch of said voltage converting circuit and which outputs the control signal to the control terminal of said first switch, a second terminal which is grounded, and a control terminal which is connected electrically to said control unit for receiving the switching signal, said starter switch being controlled by the switching signal to switch between conduction and nonconduction.

7. The soft-start switching power converter according to claim 6, wherein said soft-start circuit further includes:

an adjusting current source which is connected electrically to the first terminal of said starter switch, which receives the feedback voltage from said voltage converting circuit, and which generates an adjusting current based on the feedback voltage, said voltage step-down unit receiving a portion of the adjusting current and generating the operating voltage based on the control signal and the portion of the adjusting current received thereby.

8. A soft-start switching power converter comprising:

a rectifier circuit which receives an alternating-current (AC) voltage and which rectifies the AC voltage so as to generate a rectified voltage;

a voltage converting circuit which includes a transformer including a primary winding, a first secondary winding and a second secondary winding, each of which includes a dotted end and a non-dotted end, the non-dotted end of said primary winding being connected to said rectifier circuit for receiving the rectified voltage therefrom, a first switch including a first terminal that is connected electrically to the dotted end of said primary winding, a second terminal, and a control terminal that receives a control signal, said first switch being controlled by the control signal to switch between conduction and nonconduction, said second secondary winding, based on the conduction and nonconduction of said first switch and a turns ratio of said primary winding to said second secondary winding, generating an induced current that is associated with the rectified voltage, said voltage converting circuit generating a feedback voltage according to the induced current, and a first resistor connected electrically to said primary winding and the control terminal of said first switch;

a voltage divider circuit which is grounded, which is connected electrically to the control terminal of said first switch, and which divides the control signal so as to generate a divided voltage signal; and a soft-start circuit which is connected electrically to the control terminal of said first switch, and to the voltage divider circuit for receiving the divided voltage signal therefrom, and which generates the control signal based on the divided voltage signal, said soft-start circuit adjusting during a start-up period a voltage level of the control signal based on a voltage level of the divided voltage signal so as to control said first switch to switch between conduction and nonconduction, wherein the start-up period is proportional to a period of time required for the feedback voltage to increase to a preset starting voltage.

9. The soft-start switching power converter according claim 8, wherein said voltage converting circuit further includes:

a second resistor being grounded and being connected electrically to the second terminal of said first switch, a voltage across said second resistor serving as a trigger signal;

a first diode having an anode connected electrically to the dotted end of said first secondary winding, and a cathode;

a first capacitor connected electrically between the cathode of said first diode and the non-dotted end of said first secondary winding, a voltage across said first capacitor serving as a direct-current (DC) output voltage; and a series connection of a third resistor, a second diode and a second capacitor, the series connection being grounded and being connected electrically to the dotted end of said second secondary winding, said second diode having an anode connected electrically to said third resistor, and a cathode connected electrically to said second capacitor, a voltage across said second capacitor serving as the feedback voltage.

10. The soft-start switching power converter according to claim 8, wherein said first resistor is connected electrically between the non-dotted end of said primary winding and the control terminal of said first switch.

11. The soft-start switching power converter according to claim 8, wherein said first resistor is connected electrically between the dotted end of said primary winding and the control terminal of said first switch.

12. The soft-start switching power converter according to claim 8, wherein said soft-start circuit determines during the start-up period whether or not to clamp a voltage level of the control signal at a preset voltage level based on whether the voltage level of the divided voltage signal is greater than a preset value, so as to turn off said first switch;

wherein when the voltage level of the control signal is not clamped at the preset voltage level during the start-up period, the voltage level of the control signal rises from the preset voltage level; and wherein said soft-start circuit includes a switching controller including:

a voltage step-down unit which is connected electrically to the control terminal of said first switch for receiving the control signal and which generates an operating voltage based on the control signal, a current source which is connected electrically to said voltage step-down unit for receiving the operating voltage, and which generates a current signal based on the operating voltage, a third switch which has a first terminal connected electrically to said current source for receiving the current signal, a second terminal being grounded, and a control terminal connected electrically to said voltage divider circuit for receiving the divided voltage signal, said third switch being controlled by the divided voltage signal to switch between conduction and nonconduction, and outputting an adjust signal at the first terminal of said third switch, an inverter which includes a first terminal connected electrically to said voltage step-down unit for receiving the operating voltage, a second terminal being grounded, an input terminal connected electrically to the first terminal of said third switch for receiving the adjust signal, and an output terminal providing an output signal that has a logic level opposite to that of the adjust signal, and a control unit which is connected electrically to said voltage step-down unit and said inverter for receiving the operating voltage from said voltage step-down unit and the output signal from said inverter, and which generates a switching signal based on the output signal; and a starter switch having a first terminal which is connected electrically to the control terminal of said first switch of said voltage converting circuit and which outputs the control signal to the control terminal of said first switch, a second terminal which is grounded, and a control terminal which is connected electrically to said control unit for receiving the switching signal, said starter switch being controlled by the switching signal to switch between conduction and nonconduction.

13. The soft-start switching power converter according to claim 12, further comprising:

an adjusting current source which is connected electrically to the first terminal of said starter switch, which receives the feedback voltage from said voltage converting circuit, and which generates an adjusting current based on the feedback voltage, said voltage step-down unit receiving a portion of the adjusting current and generating the operating voltage based on the control signal and the portion of the adjusting current received thereby.

14. The soft-start switching power converter according to claim 9, wherein said soft-start circuit is further connected electrically to the second terminal of said first switch of said voltage converting circuit for receiving the trigger signal, and adjusts the control signal based on the trigger signal, wherein said soft-start circuit determines during a start-up period whether or not to clamp the voltage level of the control signal at a preset voltage level based on whether a voltage level of the trigger signal is greater than the voltage level of the divided voltage signal, so as to turn off said first switch, wherein when the voltage level of the control signal is not clamped at the preset voltage level during the start-up period, the voltage level of the control signal rises from the preset voltage level, and wherein said soft-start circuit includes a switching controller including:

a voltage step-down unit which is connected electrically to the control terminal of said first switch for receiving the control signal, and which generates an operating voltage based on the control signal;

a comparator which has a first input connected electrically to the second terminal of said first switch for receiving the trigger signal, a second input connected electrically to said voltage divider circuit for receiving the divided voltage signal, and an output, said comparator generating an output signal at the output thereof based on the trigger signal and the divided voltage signal; and a control unit which is connected electrically to said comparator for receiving the output signal therefrom, and which generates a switching signal based on the output signal received thereby; and a starter switch having a first terminal which is connected electrically to the control terminal of said first switch of said voltage converting circuit and which outputs the control signal to the control terminal of said first switch, a second terminal which is grounded, and a control terminal which is connected electrically to said control unit for receiving the switching signal, said starter switch being controlled by the switching signal to switch between conduction and nonconduction.

15. The soft-start switching power converter according to claim 14, wherein said soft-start circuit further includes:

an adjusting current source which is connected electrically to the first terminal of said starter switch, which receives the feedback voltage from said voltage converting circuit, and which generates an adjusting current based on the feedback voltage, said voltage step-down unit receiving a portion of the adjusting current and generating the operating voltage based on the control signal and the portion of the adjusting current received thereby.

\* \* \* \* \*